(12) United States Patent
Wilhelm et al.

(10) Patent No.: US 7,550,116 B2
(45) Date of Patent: Jun. 23, 2009

(54) METHOD FOR PRODUCING POLYESTERS AND A DISK RING REACTOR FOR THE METHOD

(75) Inventors: Fritz Wilhelm, Karben (DE); Michael Reisen, Frankfurt am Main (DE); Ludwig Hölting, Bruchköbel (DE); Peter Seidel, Hanau (DE); Peter Reichwein, Dornburg (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 0 days.

(21) Appl. No.: 11/667,156

(22) PCT Filed: Oct. 20, 2005

(86) PCT No.: PCT/EP2005/011264

§ 371 (c)(1),
(2), (4) Date: Oct. 4, 2007

(87) PCT Pub. No.: WO2006/048123

PCT Pub. Date: May 11, 2006

(65) Prior Publication Data

US 2008/0064834 A1 Mar. 13, 2008

(30) Foreign Application Priority Data

Nov. 4, 2004 (DE) .................... 10 2004 053 199

(51) Int. Cl.
*B01J 19/18* (2006.01)
*B01J 19/00* (2006.01)
*C08F 2/00* (2006.01)

(52) U.S. Cl. .................. 422/135; 422/131; 526/68; 528/308.1

(58) Field of Classification Search .............. 422/135, 422/131; 526/68; 528/308.15
See application file for complete search history.

(56) References Cited

U.S. PATENT DOCUMENTS

| 3,499,873 A | 3/1970 | Kuehne ................... 23/285 |
| 3,591,344 A | 7/1971 | Schnock .................. 23/285 |
| 3,617,225 A | 11/1971 | Kuehne ................... 23/285 |
| 3,684,458 A | 8/1972 | McCammon ............. 23/285 |
| 3,761,059 A | 9/1973 | Rothert ...................... 259/9 |
| 5,055,273 A | 10/1991 | Wilhelm ................. 422/135 |
| 5,599,507 A | 2/1997 | Shaw et al. |
| 5,779,986 A | 7/1998 | vanEndert .............. 422/136 |

FOREIGN PATENT DOCUMENTS

| DE | 4447422 A1 | * 7/1996 |
| DE | 10235383 C1 | * 12/2003 |
| EP | 1 386 659 A1 | 2/2004 |
| GB | 1435767 A | * 5/1976 |

* cited by examiner

*Primary Examiner*—Walter D Griffin
*Assistant Examiner*—Natasha Young
(74) *Attorney, Agent, or Firm*—Andrew Wilford

(57) ABSTRACT

The invention relates to a method and a device for producing polyesters such as for example polyethylene terephthalate, polypropylene terephthalate and polybutylene terephthalate from precondensates. According to said method, vapors comprising precondensate components that are distributed therein in the form of an aerosol are guided through a polycondensation reactor in which precondensate components condense on the reactor wall and on a separator in an exit chamber of the reactor. The condensates are guided to the unstirred discharge sump and the upper layers of the discharge sump are continuously recirculated into the stirred reactor area thereby subjecting them to reconversion and additional polycondensation.

20 Claims, 2 Drawing Sheets

METHOD FOR PRODUCING POLYESTERS AND A DISK RING REACTOR FOR THE METHOD

CROSS REFERENCE TO RELATED APPLICATIONS

This application is the US national phase of PCT application PCT/EP2005011264, filed 20 Oct. 2005, published 11 May 2006 as WO2006/048123, and claiming the priority of German patent application 102004053199.4 itself filed 4 Nov. 2004, whose entire disclosures are herewith incorporated by reference.

FIELD OF THE INVENTION

The invention relates to a method for producing polyesters from liquefied precondensates and to a disk-ring reactor with an unstirred outlet compartment for carrying out this method.

BACKGROUND OF THE INVENTION

Disk-ring reactors used for the continuous production of polyesters have been known for some time. These are typically cylindrical, horizontal, heated vessels with inlet and outlet connections for the precondensate and polycondensate on opposite ends of the disk-ring reactor. The disk-ring reactor comprises a plurality of elements rotating about a horizontal axis, which elements mix the precondensate and produce a large surface for outgassing the polycondensate when the viscous liquefied material adhering to these elements runs down. Devices of this type are described in the German patent applications 1 745 541 (U.S. Pat. Nos. 3,499,873 and 3,617,225), 1 720 692 (U.S. Pat. No. 3,591,344), 2 100 615 (U.S. Pat. No. 3,684,458) and 2 114 080 (U.S. Pat. No. 3,761,059) as well as in the European patents and patent applications 0 320 586 (U.S. Pat. No. 5,055,273), 0 719 582 (U.S. Pat. No. 5,779,986), 0 711 597 (U.S. Pat. No. 5,599,507) and 1 386 659.

The disadvantage with known disk-ring reactors is that polycondensate residue deposits on the inside wall of the reactor, resulting not only in encrustation and fouling of the reactor, but additionally producing a discolored product with undesirable inclusions if the product adheres to the inside reactor wall for an extended period and is exposed to high reaction temperatures, which result in thermal damage to and cross-linking of the polycondensate. Non-filterable, gel-like contamination interferes with the polymer-processing operation and in the end reduces the product quality.

OBJECT OF THE INVENTION

The object is therefore to develop a novel method and an improved disk-ring reactor, in which during the polycondensation operation a self-cleaning effect occurs that prevents the formation of encrustation, deposits and defective product on the inside reactor wall and thus guarantees a consistently high product quality.

The object of the invention is therefore a method for producing polyesters, such as polyethylene, polypropylene and polybutylene terephthalate from precondensates, according to which vapors comprising precondensate components distributed therein in the form of an aerosol are fed through a polycondensation reactor in which precondensate components precipitate on the reactor wall and into an outlet compartment of the reactor on a separator. The precipitate is then conducted into the unstirred discharge compartment and the upper layers of the discharge sump are continuously recirculated into the stirred reactor area and thus subjected to reconversion and further polycondensation.

SPECIFIC DESCRIPTION

Figure 1:
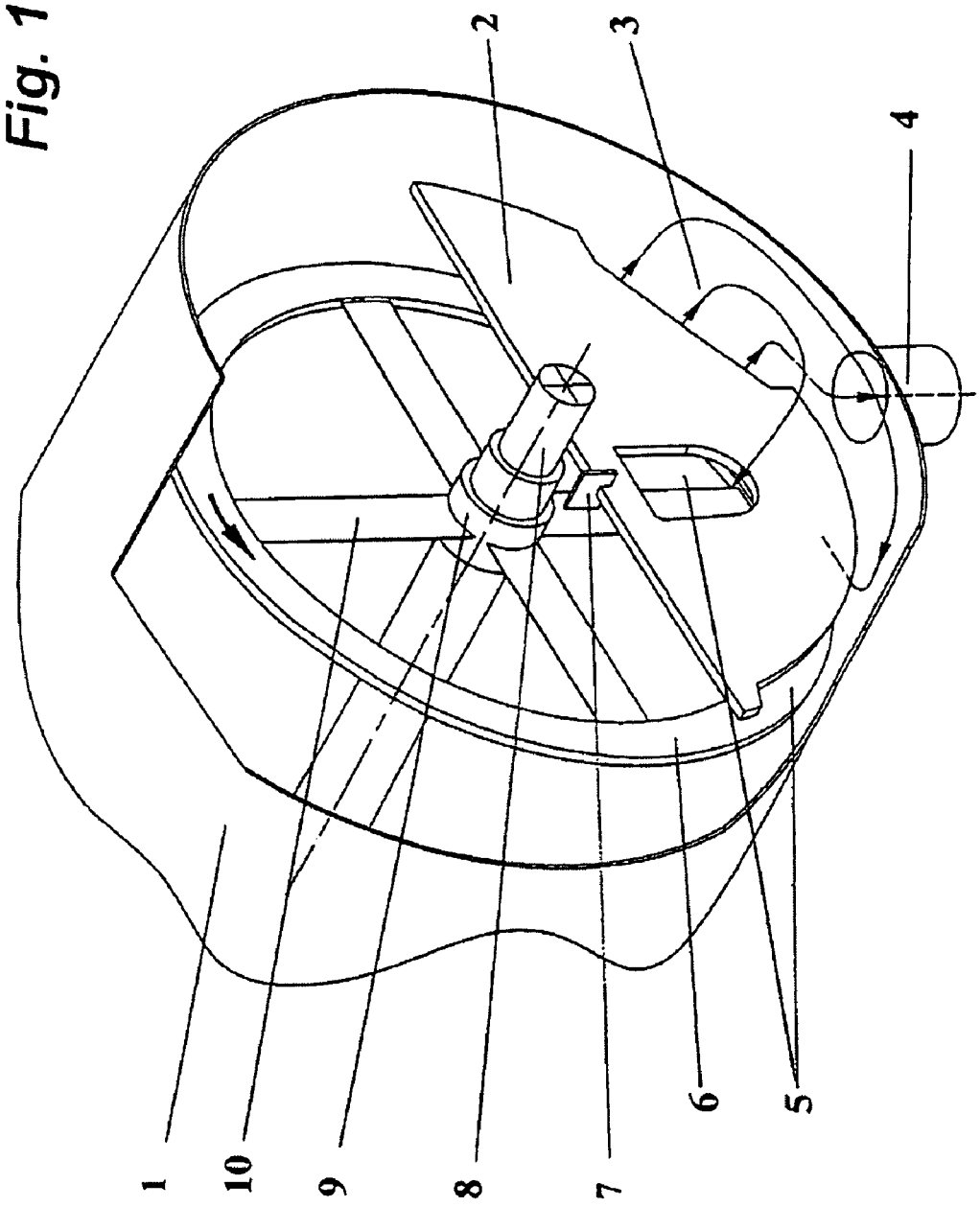
FIG. 1 is a partly cut away perspective view of an end of a reactor according to the invention.

It is preferred if a disk-ring reactor is used as the polycondensation reactor, in which in the interest of uniform residence times and an increase in the controlled viscosity the reaction chamber in the sump is divided into several compartments by separating plates or partitions, which compartments are connected to one another by means of outflow openings. A disk-ring reactor of this type according to the present invention for producing polyesters comprises a heatable, cylindrical, horizontal vessel 1 with at least one inlet 17 for the melt and at least one outlet 4 as well as at least one vapor outlet 14 above the melt outlet 4 and an internal agitating system that is adapted to the vessel shape. This agitating system includes vertically disposed annular disks or rings 16 that are attached by means of spokes 10 to at least one common horizontal drive shaft 8. Backflow is achieved from the unstirred outlet compartment through at least one opening 5 of the partition 2 into the upstream, stirred compartment. Since the contents of the outlet compartment are not moved by means of rotating elements 10, 16, reliable level measuring and a minimum product level are possible; the discharge of the finished polycondensate is not disturbed.

In a disk-ring reactor of this type, the openings provided in the last partition are at least one product outflow opening (preferably opposite the product outlet 4 on the bottom on the side of the product sump raised by the rotating annular disks or rings 16, meaning the emersion side of the agitator) and at least one product backflow opening (on the opposite immersion side of the agitator), which is preferably configured as a wall-side peripheral opening expanding steadily from the lowest point of the vessel 1 to exclude stagnating sump zones.

Improved level control and level minimization are achieved by means of a further overflow opening (delimiting the discharge sump) that is provided radially inside the last annular disk. This reduces circulation flow between the last agitated compartment and the discharge chamber, preventing breakdown of the polymer and product discoloration as a result of excessive residence times in corners without flow.

Since due to its high viscosity the product adheres to the agitator elements, a kidney-shaped profile in cross-section develops in the sump that is considerably higher in the direction of rotation than on the opposite side on which the agitator elements dip down into the sump. Due to the raised product outflow opening on the exit side of the agitator element, the polymer gushes into the outlet compartment and then flows through the wall-side opening on the agitator element entrance side back into the adjacent stirred compartment, an immersed partial product flow leaving the outlet compartment via the outlet nozzle (FIG. 1). The positions of the inlet and outlet openings in the last partition allow the flow direction, flow intensity and the sump level to be controlled. Due to the raised overflow opening, product is also conducted from the surface of the outlet compartment into the last stirred compartment, so that the precondensate material dripping from the baffle and flowing off the back wall is fed to a proper reaction in the main polymer mass.

Figure 2C:
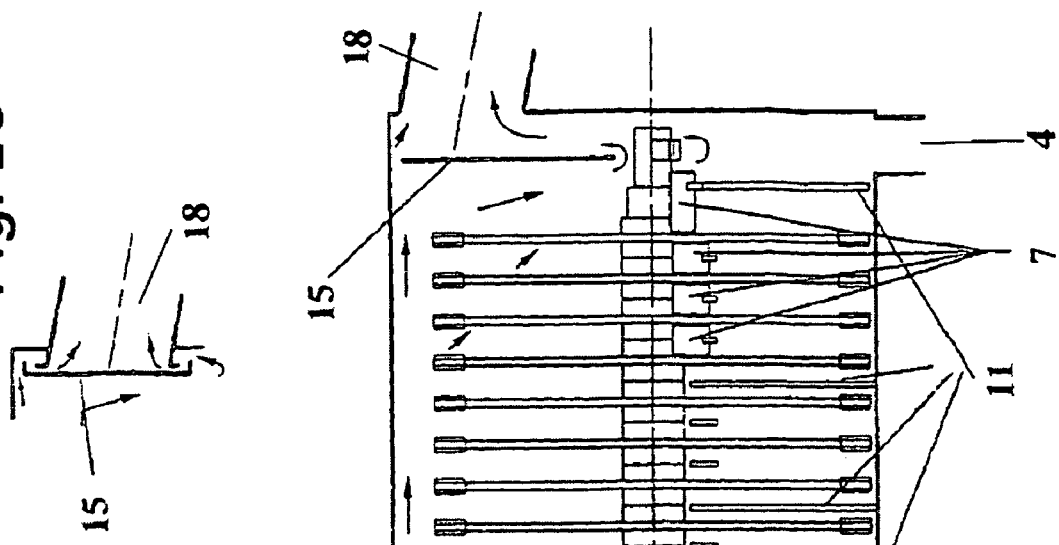
FIG. 2C is a detail view of a variant on the system of this invention.
Figure 2B:
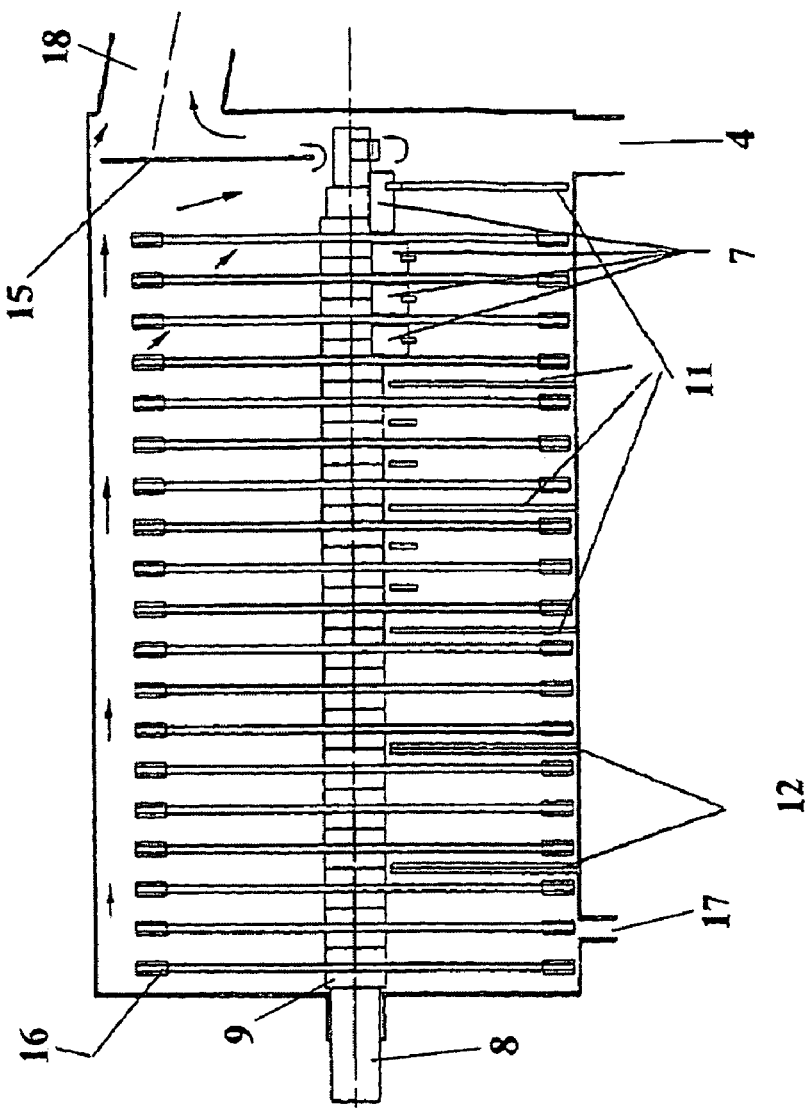
FIG. 2B is a small-scale longitudinal section through the reactor.
Figure 2A:
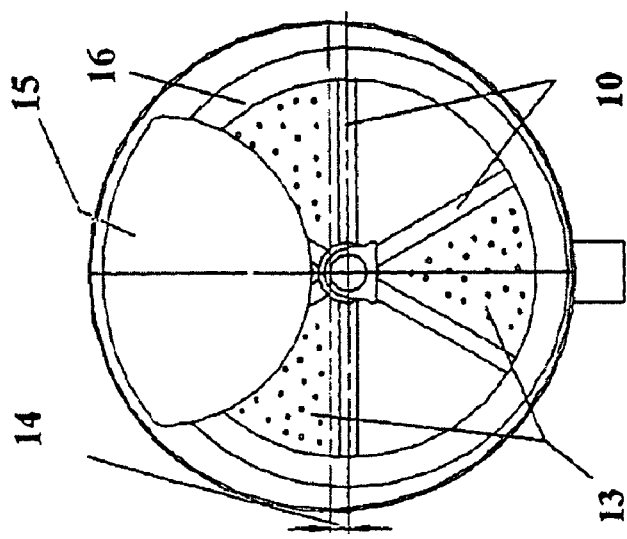
FIG. 2A is a small-scale cross section through the reactor.

When using suitable process conditions, the design of the disk-ring reactor according to the present invention causes the precondensate to reach the vapor flow first as a result of the foaming of the reaction mass and the splashing of droplets from the agitators containing the product against the reactor wall (particularly when vapor bubbles burst on the agitator surface), second as a result of the suspending and entraining of fine aggregates (droplets, foam lamellae) and produces the subsequent precipitation of precondensate from the vapors on the reactor walls. According to the invention, this process is increased when guiding the vapors in a targeted fashion in the upper reactor part (when sufficiently high resistance against axial flow have been installed in the inside reactor area) and when increasing the peripheral movement of the agitators in the reactor entrance region and the secondary flow (vortex cells) between the annular disks 16 and the upper reactor wall. Since the gas outflow according to the invention is provided on the product discharge side of the disk-ring reactor, low-viscosity precondensate components also reach the walls at the back of the reactor in the form of a film together with the droplet-containing aerosol-like vapors, loosening the otherwise tough films and making them flowable before thermal damage and residue formation can occur in the leak air-free reactor system (FIG. 2). This effectively counteracts any encrustation or deposits of polyesters on the inside reactor wall.

The separator provided in the outlet compartment of the reactor prevents the excessive discharge of entrained product in the exhaust gas flow, which would interfere with the condensation operation, and can be configured as a baffle, a mist collector, a demister or in the form of another suitable flow deflection arrangement. A simple baffle with no dead space is particularly preferred for reasons of limited loss of pressure. This baffle may have a rim or not. The vapor nozzle for the gas outflow may have a collar or not.

To make the self-cleaning effect according to the invention as effective as possible, the intrinsic viscosity of the precondensate should be no more than 0.37 dl/g, preferably between 0.21 and 0.33 dl/g. The method for determining the intrinsic viscosity is described, for example, in DE 101 58 793 A1, page 5, lines 41-42. For the desired, partial preliminary separation of precondensate as a wall film, according to the inventive method the vapors are conducted along the ceiling wall, preferably in a sickle-shaped clearance between the reactor housing and the agitators, which clearance is present due to the eccentricity of the agitator axis relative to the housing axis. The preferred flow develops in detail due to the compartmentalized or covered product chamber extending to the agitator shaft 8, the hydromechanical, kinematic closure of the inside agitator space by the polymer films flowing off the panels and spokes 10, reinforced by an alternating offset of adjoining annular disk agitators by about half a spoke sector angle, and optionally due to the static or preferably rotating compartmenting of the vapor chamber according to the invention.

Furthermore, the method as described above is preferably implemented such that the outlet compartment has a stationary, controlled minimum product level.

The above-described disk-ring reactor can be further improved through a series of special design characteristics.

To intensify the mixing process and the renewal of the surface, it may be advantageous to use a second horizontal axis of rotation as an extension of the first axis of rotation to operate at a speed that is better adjusted to the viscosity and with reduced energy input. Since the product entrainment and the film formation on the agitator elements depend not only on the design of these elements, but particularly on the viscosity and the circumferential speed, it may additionally be advantageous to modify the circumferential speed in accordance with the progress of the reaction. Typically, the ratio of the viscosity upon entering the reactor to the viscosity upon exiting the reactor is about 1:100 to 1:200.

When in a disk-ring reactor in addition to a first agitator shaft 8 also a second agitator shaft 8 rotating at reduced speed is provided, this second shaft can be guided with the same or greater eccentricity of the shaft axis relative to the vessel axis in the exit region. Advantageously, product-lubricated bearings are provided to support and seat the agitator shaft $8s$ inside the reactor. Normally, instead of two shaft seals, this way a single shaft seal is achieved, as well as a lower risk of leaking air affecting the quality.

To achieve uniformly good mixing of the polycondensate in the sump as well as good film formation at the same speed in the cylindrical vessel 1, it is recommended to vary the spacings between in addition to the design of the agitator elements. This change of the spacing creates space, so that the more viscous film product can be mixed in the sump and the energy input remains limited due to the growing shear gap.

As a result of the second drive shaft, the rotational speed can be better adjusted to the viscosity and due to the reduced rotational speed a smaller spacing can be set between the agitator elements, resulting in a higher specific surface and making it possible to achieve a higher viscosity ratio of 1:400 to 1:1000. This second drive allows in particular the production of highly viscous products and a maximization of the specific surface, allowing the implementation of more powerful apparatuses.

The intrinsic viscosity (IV) of different polymer products can thus be increased to values of less than or equal to 1.35 dl/g, preferably in the range of IV=0.5 dl/g to 1.05 dl/g with one reactor shaft 8 and to IV=0.5 dl/g to 1.25 dl/g with two reactor shafts.

A preferred embodiment comprises a heatable, cylindrical, horizontal vessel 1 with an inlet 17 for the melt on one end and an outlet 4 on the other end as well as a vapor outlet 14 in the downstream wall above the melt outlet 4, so that the precondensate flow is guided uniformly, meaning undivided, through the reactor.

Particularly high throughput is achieved with a disk-ring reactor having a reduced diameter when the precondensate flow is divided into two partial flows that are conducted entirely or partially separately through the reactor. For this purpose, two precondensate flows can be fed on the cover of the reactor and the end product can be discharged in the center. This configuration cuts the exposure to vapor in half for any given reactor diameter.

It is also possible, however, to achieve high throughput in a disk-ring reactor with limited diameter when the precondensate flow is fed in the region of the reactor center, the flow is divided into two partial flows and both partial flows are conducted toward each other to separate product outlets on the cover. This creates the additional possibility of individually controlling the viscosity of the two end products by means of the rotational speed and by temperature control. The disadvantage is that two gas outlets are required.

All characteristics according to the invention can be implemented for uniform as well as, with the appropriate adjustment, for divided precondensate flow guidance.

The configuration of the different agitator elements on a shaft 8 by means of spokes 10 has the advantage of a simple, flexible and robust design that is easy to assembly and maintain since the agitator elements can be removed individually from the shaft 8. The cage-like designs described for example in the European patent application 0 711 597 or in the European patent specification 0 719 582, on the other hand, are complex welded designs that are difficult to maintain. There as well two shaft holes are provided, while in the design according to the invention with an inside bearing only one shaft hole per drive shaft is required. The central hollow cylinder on the cage-like agitator is associated with the disadvantage that undesirable longitudinal mixing may occur in the axial direction due to entrainment of dripping polymer and foam development. If the shaft 8 is instead mounted eccentrically in the housing, an upper sickle-shaped compartment is created through which the flow of gas can exit. In the case of higher viscosities, there is a tendency that the material flowing off the agitator elements accumulates on the shaft 8 and limits the polycondensation activity. For this reason, it is expedient to clean the shaft 8 by means of special scrapers 7, particularly in the upper viscosity range. In the medium viscosity range, a crossbar close to the shaft 8 provided between individual agitator elements will suffice. Possible agitator elements are primarily annular disks 16 or disk segments that may be configured as solid or perforated disks. These disks can be provided individually or in an assembly and can also be equipped with scoops.

The free segments formed between the spokes 10 can alternately be covered with perforated sheet metal plates. Disk ring agitators with an even number of spokes 10 can thus alternately comprise a regular free sector and a covered sector. When connecting, as is described according to the invention, at least two of these annular disks 16 in series with axially aligned spokes 10 such that in the axial perspective free and covered sectors alternately overlap, the axially flowing gas is effectively deflected, separating foam and entrained drops in the axial direction. Such deflection of the axial flow of gas results in an increase in the vertical flow component and the gas speed in the sickle-shaped compartment. In the product sump at the same time a compartmenting effect exists that prevents low-viscosity material from shooting through uncontrolled. Instead of the perforated plates, it is also possible to use unperforated plates or wire mesh.

A transition to alternating spokes 10 offset by half a spoke sector angle for consecutive disk ring agitators, which transition is preferred as the melt viscosity increases, serves not only the even blanketing of the inside agitator space, but also the improved mobility and mixing of the product sump. For increased axial conveyance of the product melt, it is additionally possible to offset the spokes 10 of consecutive agitators in the axial direction in a screw-like manner, trailing by an angle of 0.4 to 4 degrees.

Further advantages can also be achieved in that the partitions provided between the compartments can be heated. It is also advantageous if a multistage shaft sealing lip ring system operated with a buffer fluid is provided for sealing the agitator shafts relative to the outer atmosphere. In order to seal the agitator shafts relative to the outer atmosphere, it is also possible to use a dual-action axial face seal system operated with a buffer fluid. If necessary, additional cooling of the sealing system can be integrated. These sealing systems allow a maintenance-free operation life of several years.

The special design characteristics of the disk-ring reactor according to the invention are apparent from the enclosed FIG. 1 and FIG. 2.

The invention claimed is:

1. A disk-ring reactor for producing polycondensates from liquefied precondensates, the reactor comprising a heatable cylindrical and horizontal vessel centered on a housing axis and having a melt inlet, a melt outlet spaced downstream therefrom, and a vapor outlet above the melt outlet, and adapted to hold a body of the liquefied precondensate;

a plurality of partitions subdividing the vessel into a plurality of compartments spaced between the melt inlet and melt outlet and including an outlet compartment at the outlets, each partition being formed with a lower opening below a level of the precondensate body, whereby the liquefied precondensate can flow downstream from the melt inlet to the melt outlet through the compartments and between the compartments through the lower openings, the furthest downstream partition defining the outlet compartment being formed above the respective lower opening with an upper throughgoing backflow opening, whereby the liquid can pass upstream when above a level of the throughgoing upper opening from the outlet compartment into the adjacent compartment;

a horizontal rotatable drive shaft in the vessel and defining an agitator axis; and a plurality of agitators each in a respective one of the compartments but not in the outlet compartment and each including a ring generally centered on the shaft and a plurality of spokes extending between the shaft and the respective ring, whereby the liquid in the outlet compartment is not agitated.

2. The disk-ring reactor according to claim 1 wherein the backflow opening is configured as a steadily expanding, peripheral opening on the wall side, extending from the lowest vessel point.

3. The disk-ring reactor according to claim 1 wherein in addition to the wall-side, peripheral backflow opening an overflow opening delimiting the discharge sump is provided radially inside the furthest downstream ring.

4. The disk-ring reactor according to claim 1 wherein the agitator axis is positioned eccentrically relative to the housing axis.

5. The disk-ring reactor according to claim 1 wherein upstream from the vapor outlet in the outlet compartment a baffle, a mist separator, a demister or another suitable flow deflection device is provided to separate the entrained or aerosol-like dispersed product components.

6. The disk-ring reactor according to claim 1 wherein the shaft comprises a first agitator shaft part followed by a second agitator shaft part rotating at reduced speed and with the same or greater eccentricity of the shaft axis relative to the housing axis in the outlet compartment.

7. The disk-ring reactor according to claim 6 wherein product-lubricated bearings are provided to support and internally seat the agitator shaft parts.

8. The disk-ring reactor according to claim 1 wherein the inlet for precondensate is at on one end of the vessel and the melt outlet is at the other end.

9. The disk-ring reactor according to claim 1 wherein the rings are attached to a shaft by means of the spokes and hubs.

10. The disk-ring reactor according to claim 1 wherein the spokes of the rings are disposed axially aligned.

11. The disk-ring reactor according to claim 1 wherein the spokes of adjoining rings are alternately offset from each other by half a spoke sector angle between the spokes and disposed in groups axially aligned.

12. The disk-ring reactor according to claim 1 wherein the spokes of consecutive rings are disposed offset from each other in a screw-like manner.

13. The disk-ring reactor according to claim 1 wherein agitators each have an even number of spokes defining a plurality of normal free sectors alternating angularly with sectors closed by disk segments between the spokes and are disposed such that free and covered sectors alternately overlap on adjacent agitators.

14. The disk-ring reactor according to claim 1 wherein the partitions are heatable.

15. The disk-ring reactor according to claim 1 wherein a multistage shaft sealing lip system operated with a buffer fluid is provided for sealing the agitator shaft relative to the outer atmosphere.

16. The disk-ring reactor according to claim 1 wherein a dual-action axial face seal system operated with a buffer fluid is provided for sealing the agitator shaft relative to the outer atmosphere.

17. The disk-ring reactor defined in claim 1 wherein the agitators are rotated about an axis of the shaft in the vessel in such a direction as to enter the body on an immersion side of the shaft and to exit the body on an emersion side of the shaft, the lower opening of the furthest downstream partition being on the immersion side and the upper backflow opening of the furthest downstream partition being on the emersion side.

18. The disk-ring reactor according to claim 1 wherein the precondensate flow is divided into two partial flows that are conducted at least partially separately through the reactor.

19. The disk-ring reactor according to claim 18 wherein the two partial flows are guided toward each other through the reactor and are removed through a common product outlet at a center of the reactor.

20. The disk-ring reactor according to claim 18 wherein the two partial flows are conducted toward each other to separate product outlets on cover sides.

\* \* \* \* \*